(12) United States Patent  
Scott

(10) Patent No.: US 6,209,825 B1
(45) Date of Patent: Apr. 3, 2001

(54) LOW POWER LOSS ELECTRO HYDRAULIC ACTUATOR

(75) Inventor: Howard Z. Scott, Weatherford, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/031,985

(22) Filed: Feb. 27, 1998

(51) Int. Cl.[7] .................................................. B64C 13/40
(52) U.S. Cl. ........................... 244/226; 244/215; 244/78
(58) Field of Search ............................ 244/78, 226, 215; 92/12.2, 72; 417/269; 91/504, 506

(56) References Cited

U.S. PATENT DOCUMENTS

| 2,864,239 | 12/1958 | Taylor . |
| 3,679,156 | 7/1972 | Redmond, Jr. . |
| 4,858,480 | 8/1989 | Rohde et al. . |
| 4,862,789 | 9/1989 | Burgess et al. . |
| 5,074,495 | 12/1991 | Raymond . |
| 5,076,517 | * 12/1991 | Ferranti et al. . |
| 5,209,429 | * 5/1993 | Doolin et al. . |
| 5,230,274 | 7/1993 | Yu et al. . |
| 5,253,576 | * 10/1993 | Bethke . |
| 5,630,352 | 5/1997 | Todd . |
| 5,794,515 | * 8/1998 | Bethke . |

* cited by examiner

Primary Examiner—Peter M. Poon
Assistant Examiner—Tien Dinh
(74) Attorney, Agent, or Firm—Arthur F Zobal

(57) ABSTRACT

The system includes a hydraulic surface actuator for operating a piston coupled to a structural member of an aircraft for moving the structural member. An electrical feedback sensor is coupled to the actuator piston rod. A summing circuit for receiving a command signal and the feedback signal is provided having an output which is coupled to a loop gain compensator for operating a servo motor. The shaft of the servo motor drives the shaft of a variable displacement pump having ports leading to the ports of the actuator. The variable displacement pump has a swash plate the angle of which is reduced by a hinge moment sensor and a de-stroking actuator when the load on the surface actuator exceeds a given percentage of maximum. A pump gain sensor measures the reduction in pump gain and produces an electrical output which is applied to the loop gain compensator to compensate for reduction in pump gain.

9 Claims, 3 Drawing Sheets

LOW POWER LOSS ELECTRO HYDRAULIC ACTUATOR

BACKGROUND OF THE INVENTION

1. Field of the Invention

A system for reducing the electrical losses of an electro-hydraulic actuator used for aircraft control purposes.

2. Description of the Prior Art

The present Electro Hydraulic Actuator (EHA) for controlling aircraft components such as control surfaces comprises a Hydraulic Surface Actuator, powered by a DC Servo-motor driving a multi-piston constant displacement Bi-directional Hydraulic Pump and contains an electrical Actuator Feedback Sensor installed on the Actuator Piston Rod. The actuator servo input is an Electrical Command Signal coming from a computer that processes signals from cockpit controllers and control switches, from internal sensors in the airframe, from aerodynamic sensors and, in some cases, from external signals. This command signal is summed in a Summing Amplifier with the Actuator Output Position Voltage as detected by an Actuator Feedback Sensor. The difference between the input and the output voltage, the Error Signal is applied to the DC Servo-motor to drive the pump in a direction to hydraulically force the Actuator Piston Rod to reduce that error. Under no-load conditions, the actuator is driven to that position where the voltage from the Actuator Feedback Sensor equals the input voltage. When an airload is applied to the actuator, the actuator displaces the small amount needed to create an Error Signal voltage on the output of the Summing Amplifier equal to that voltage required to produce the motor winding current and the associated motor torque necessary to balance the applied load. When maximum actuator load is applied, this Error Signal voltage, as measured at the motor, equals the line voltage, and the motor current required to balance that load is line voltage divided by the DC resistance of the motor windings (stalled rotor current). The input power required to produce and maintain stall hinge-moment equals stall hinge-moment times maximum no-load surface rate (ft-lbs./sec.). This EHA design results in extremely high current draw and power losses at high hinge moments, particularly stall, resulting in high heat losses.

SUMMARY OF THE INVENTION

It is an object of the invention is to reduce the peak electrical input power requirements of the EHV actuator.

It is a further object of the invention to reduce the EHA system weight by the reduction in the required size of the servo-motor and thus reducing the size of the associated driver electronics, wire size and the size of the power generating and cooling equipment needed to meet aircraft and control system requirements.

It is a further object of this invention to reduce electrically induced heat losses in the EHA under high sustain actuator loadings.

The present invention uses a variable displacement pump in lieu of the constant displacement unit and a hinge moment sensor is added to de-stroke the pump. A de-stroking Actuator is employed which is powered by absolute differential cylinder port pressure. When the absolute value of the differential port pressure is less than a given percentage of maximum, the swash plate angle in the pump is at maximum and the pump piston stoke is at a maximum. As port differential pressure is increased above this percentage the swash plate angle is reduced linearly which shortens the piston stroke thus increasing the mechanical advantage of the motor over the pump and reducing the motor torque needed to produce that differential pressure. At maximum actuator load, the pump piston stroke is reduced to 10% or less thus reducing the electrical input power to 1% or less of that power required to maintain the same load using a constant displacement pump. As the swash plate angle is decreased; the mechanical advantage to the motor is increased, the maximum actuator rate is reduced and if loop compensation is not supplied, the actuator bandpass is lowered.

In the embodiment disclosed, the hinge moment sensor comprises a Free Floating Piston and the appropriate porting needed to maintain a volume balance between the surface actuator cylinder ports and to detect which port has the greater pressure. The port having the highest pressure shuttles the free floating piston to that position required to retract the de-stroking actuator piston when the load on the surface actuator exceeds the given percentage of maximum. As the load is increased above the given percentage, the de-stroking actuator piston is retracted and the swash plate angle reduced accordingly.

In a further aspect, a pump gain sensor is provided to measure the reduction in pump gain (increase in mechanical advantage) by producing a measurement representative of the angular position of the swash plate. The output voltage from the pump gain sensor is used by the loop gain compensator in the forward path of the servo-loop to increase the forward path electrical gain and compensate for the corresponding reduction in pump gain, thus maintaining the EHA bandpass.

DESCRIPTION OF THE PRIOR ART

Figure 1:
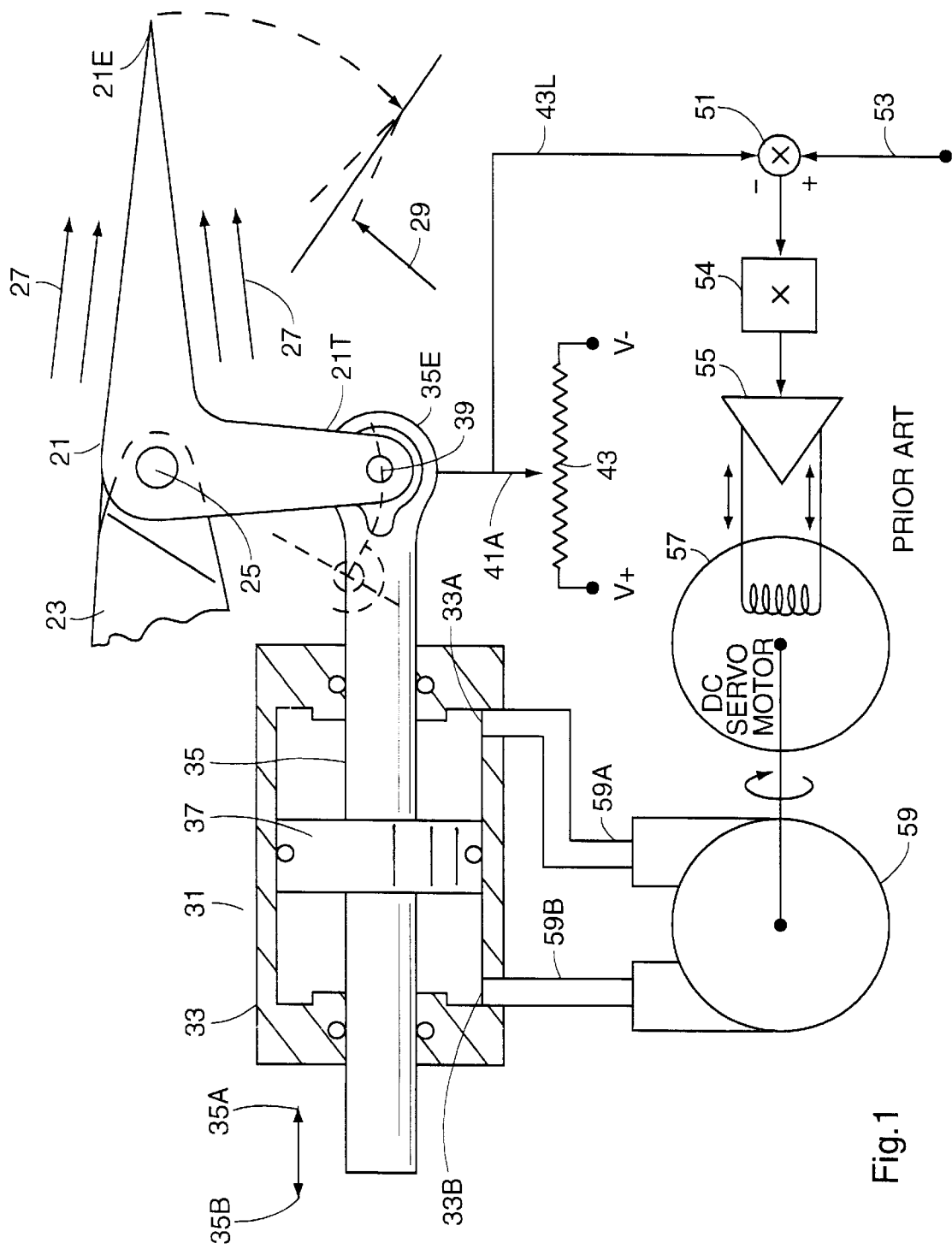
FIG. 1 is a schematic of a prior art system.

Referring now to FIG. 1, there is disclosed a control surface 21 of an aircraft pivotally coupled to structure 23 of the aircraft by pivot pin 25. Air flow next to the surface is indicated by arrows 27. If the outer edge of the surface 21 is moved downward air load is indicated by arrow 29.

A hydraulic surface actuator 31 is employed to move the surface 21 relative to structure 23. The actuator 31 comprises a cylinder 33 in which a piston 35 rod with an enlarged inner ring 37 is supported to move in the direction of arrows 35A or 35B. The outer end 35E of the piston rod 35 is pivotally coupled by pin 39 to a transverse portion 21T of the surface 21 for moving the free end 21E of the surface upward or downward as shown. The position of the piston rod 35 is sensed by the arm 41A of a potentiometer 43 which is an electrical actuator feedback sensor and the electrical output is applied by lead 43L to a summing amplifier 51. An electrical command signal on lead 53 comes from a computer that processes signals from cockpit controllers and control switches, from internal sensors in the airframe, from aerodynamic sensors and, in some cases, from external signals. This command signal is summed in the summing amplifier 51 with the actuator output piston voltage as produced by the actuator feedback sensor. The difference between the input and the output voltage, the error signal, is applied, by way of a loop gain compensator 54 and an amplifier 55, to a DC Servo motor 57 to drive a constant displacement hydraulic pump 59 in a direction to hydraulically force the actuator piston rod 35 to reduce the error. The RPM of the motor 57 is proportional to the input voltage minus the voltage required to produce the motor torque needed to balance the load applied to the motor. The pump 59 has conduits 59A and 59B connected to ports 33A and 33B of the cylinder 33. Under no-load conditions, the actuator is driven to that position where the voltage from the actuator feedback sensor equals the input voltage. When an airload is applied to the actuator, the actuator displaces the small amount needed to create an error signal voltage on the output of the summing amplifier 51 equal to that voltage required to produce the motor winding current and the associated motor torque necessary to balance the applied load. When maximum actuator load is applied, this error signal voltage, as measured at the motor, equals the line voltage, and the motor current required to balance that load is line voltage divided by the DC resistance of the motor windings (stalled rotor current). The input power required to produce and maintain stall hinge-moment equals stall hinge-moment times maximum no-load surface rate (ft-lbs./sec).

Current electro hydraulic actuators operate at a fixed pump displacement and variable motor speed and hydraulic pressure. They result in extremely high current draw and power losses at high hinge moments, particularly stall, resulting in high heat losses. It is desirable to have the power-in to be at a minimum at no load/maximum rate and also at a near minimum under stall load condition.

Description of the Preferred Embodiments

This may be accomplished by modifying the EHA design as follows. Reduce the pump gain to 10% or less at stall hinge-moment starting at some percent stall hinge-moment and increasing the forward path electrical gain appropriate to maintain adequate control surface actuator bandpass. The pump gain may be varied linearly or in any appropriate manner. This invention will reduce the actual input power level to 31% of its theoretical value by optimizing the power losses on both ends of the hinge-moment spectrum.

One means of varying the pump gain is to de-stroke the pump by reducing the swash plate angle. Reducing the pump swash plate angle reduces the pump displacement per revolution starting at any percent stall hinge moment and ending preferably but not limited to 10% displacement at actuator stall hinge moment. The pump displacement characteristics will depend upon application design constraints such as desired surface rate, desired surface hinge moment, actuator heat loss, and electronic control system logic.

Thus this invention reduces the electrical losses of an Electro-Hydraulic Actuator (EHA) when the hinge moment is greater than a given percentage of stall hinge moment.

Figure 2:
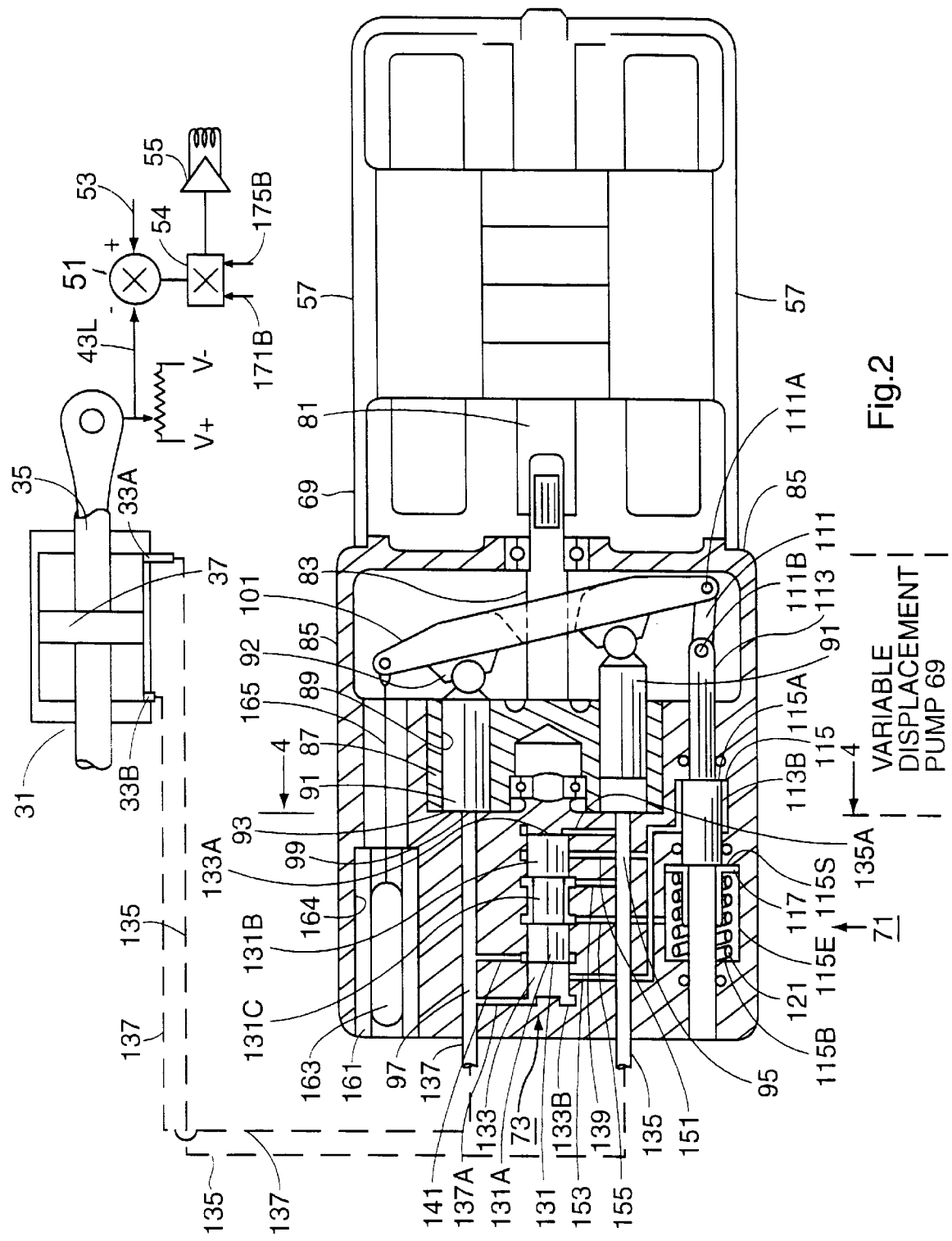
FIG. 2 is a partial cross-section of the apparatus of the invention.

Referring to FIG. 2, the system of FIG. 1 is modified by substituting a variable displacement hydraulic pump 69 for the fixed displacement hydraulic pump 59 and employing a de-stroking actuator 71 and a hinge moment sensor 73 to de-stroke the pump 69.

U.S. Pat. Nos. 4,862,789; 5,230,274; and 5,630,352 disclose variable displacement hydraulic pumps. These patents are hereby incorporated into this application by reference.

FIG. 2 illustrates the DC servo motor 57 having its shaft 81 coupled to the shaft 83 of the variable displacement hydraulic pump 69. The pump 69 comprises a housing 85 having a rotor 87 which is rotated by the shaft 83. The rotor 87 has a plurality of cylinder bores 89 formed therein equally spaced about the axis of the rotor. Each bore 89 houses a piston 91 which reciprocates as the rotor 87 is rotated. One end of the rotor rotates against a fixed valve plate or structure 93 within the housing and which has two ports 95 and 97. Each bore 89 has an opening 99 adjacent to the valve plate 93 and as the rotor 87 is rotated, each bore communicates with the ports 95 and 97 in the valve plate. If the rotor 87 is rotated in one direction, ports 95 and 97 act as inlet and outlet ports respectively and if the rotor 87 is rotated in an opposite direction, the ports 95 and 97 act as outlet and inlet ports respectively. The pistons 91 are connected through piston shoes 92 to bear against a swash plate 101. The piston shoes are held against the swash plate by compression force during the discharge stroke and by a shoe hold down plate and hold down ring (not shown) during the intake stroke. As the rotor 87 is turned by the drive shaft 83, the pistons 91 follow the swash plate which causes the pistons to reciprocate. The ports 95 and 97 in the valve plate 93 are arranged so that the pistons 91 pass the low pressure inlet as they are being pulled out and pass the high pressure outlet as they are being forced back in. Reference is made to U.S. Pat. Nos. 4,862,789; 5,230,274; and 5,630,252 for a more detailed disclosure of variable displacement hydraulic pumps. The swash plate 101 does not rotate. Its angle relative to the axis of the shaft 83 can be varied. It comprises a yoke which allows it to pivot from that of a maximum angular position relative to a plane perpendicular to the axis of shaft 83, as shown, to a zero angular position wherein the swash plate 101 is perpendicular to the axis of the shaft 83. In accordance with the present invention, the angle of the swash plate 101 relative to the axis of the shaft 83 can be varied by a rod 111 pivotally coupled by a pin 111A to one end of the swash plate 101 and pivotally coupled by a pin 111B to a piston rod 113 of the de-stroking actuator 71 which is connected to a piston body 113B located to reciprocate in a cylinder 115 of the actuator 71. This varies the stroke of the pistons 91. An enlarged ring 117 is connected to the piston body 113B for sliding in an enlarged part 115E of the cylinder 115. The ring 117 limits movement of the piston 113 to the right as shown in FIG. 2 when it engages a shoulder 115S of the cylinder 115. A spring 121 engages the end 115B of the cylinder 115 and the ring 117 to normally urge the piston 113 to the right as seen in FIG. 2. When the piston 113 is fully extended to the right as shown in FIG. 2, swash plate angle is at a maximum. As the piston 113 moves inward in its cylinder 115 (to the left as seen in FIG. 2) against the spring 121, the swash plate angle decreases relative to a plane perpendicular to the axis of the shaft 83.

The hinge movement sensor 73 comprises a free floating piston 131 and appropriate porting needed to maintain a volume balance between the surface actuator ports 33A and 33B and to detect which port has the greater pressure. The port having the highest pressure shuttles the free floating piston 131 to that position required to retract the de-stroking actuator piston 113. The spring 131 is pre-set such that when the load on the surface actuator 31 exceeds 20% (600 psi) of maximum, the de-stroking actuator piston 113 is retracted and the swash plate angle is reduced accordingly. The piston 113 is fully retracted at 3000 psi. When the port differential pressure is increased above 20% of maximum, the swash plate angle is reduced linearly which shortens the piston strokes thus increasing the mechanical advantage of the motor 57 over the pump and reducing the motor torque needed to produce that differential pressure. As the swash plate angle is decreased, the mechanical advantage to the motor 57 is increased. Thus as the pump 69 is de-stroked, the pump pumps less fluid per revolution which requires less torque on the pump by the motor 57. This results in less heat loss by the motor 57. Thus a smaller motor 57 may be employed i.e. ⅓ of the power rating of a normal EHA. In other words, as the swash plate angle is decreased, the mechanical advantage of the motor 57 is increased in that more revolutions of the pump shaft 83 are required to pump a given amount of fluid which requires less torque on the motor.

A pump gain sensor 161, 163 located in a cavity 164 is provided to measure the reduction in pump gain by measuring the position of the angular position of the swash plate 101. The electrical output from the pump gain sensor 161, 163 is used by the loop gain compensator 54 in the forward path of the servo loop to increase the forward path electrical gain and to compensate for the corresponding reduction in pump gain. In this respect, in a servo loop, the response of the system is defined by the product of all blocks or electrical components in the forward and feedback paths. If the gain of any block or electrical component in the system is reduced, such as the pump gain, the response of the system is reduced since the rise time is lower. Thus in order to keep the gain constant, and assuming the gain of one part of the system is reduced i.e. the pump gain, the reciprocal of the output of the pump gain sensor 161, 163 is multiplied at 54 or used to keep the total gain constant.

The hinge moment sensor 73 comprises a free floating piston 131 having enlarged diameter end portions 131A and 131B and a smaller diameter middle portion 131C located to reciprocate in a cylinder 133. Coupled to the ports 33A and 33B are two conduits 135 and 137 which also are coupled to the ports 97 and 95. Ports 95 and 97 have passages 135A and 137A which lead to the ends 133A and 133B of cylinder 133. Coupled to conduits 135 and 137 by way of ports 95 and 97 are two passages 139 and 141 respectively which are in fluid communication with the cylinder 133 inward of the ends 133A and 133B. Two passages 151 and 153 are in fluid communication with the cylinder 133 between end 133A and passage 139 and between end 133B and passage 141 respectively and with the cylinder 115 and its end 115A. A passage 155 is a fluid communication with the middle part of cylinder 133 and with cylinder 115E.

If the port 33A has the higher pressure, that higher pressure is applied to the end 133A of cylinder 133 by way of conduit 135, port 95, and passage 135A, to move the piston 131 to the left as seen in FIG. 2 to allow that higher pressure to flow by way of conduit 151 to the end 115A of the cylinder 115 to move the piston 113B to the left as seen in FIG. 2 to against the spring 121 to retract the piston 113B and hence to de-stroke the pump 69.

If the port 33B has the higher pressure, that higher pressure is applied to the end 133B of the cylinder 133 by way of conduit 137, port 97, and passage 137A, to move the piston 131 to the right as seen in FIG. 2 to allow that higher pressure to flow by way of conduit 153 to the end 115A of the cylinder 115 to move the piston 113B to the left as seen in FIG. 2 to retract the piston 113B and hence to de-stroke the pump 69.

Figure 3:
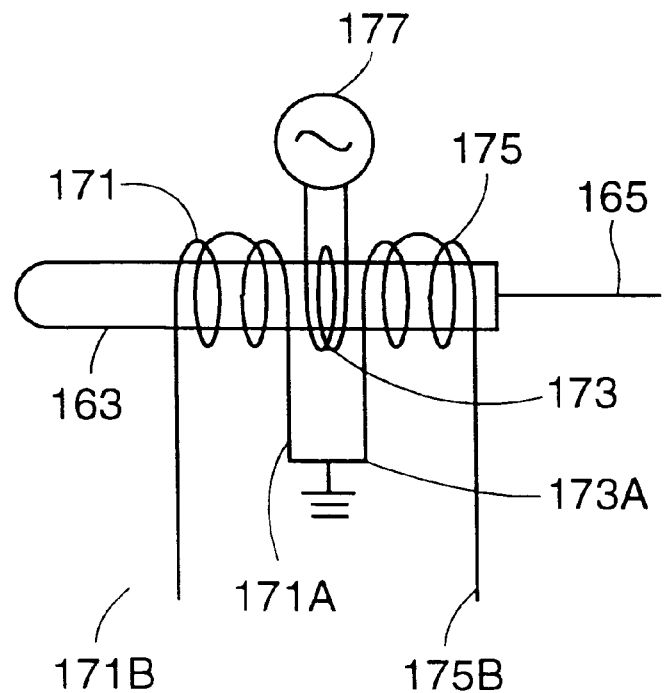
FIG. 3 is an electrical schematic of a linear variable differential transformer used in the apparatus of FIG. 3.

Referring also to FIG. 3 the pump gain sensor 161, 163 comprises, a linear variable differential transformer (LVDT) 161 and with an iron core 163 connected by rod 165 to the other end of the swash plate 101 to produce a measurement representative of the angular position of the swash plate 101. The core 163 can move within coils 171, 173, and 175 of the transformer 161 as the angle of the swash plate 101 is varied. An AC source 177 is coupled to coil 173. Coils 171 and 175 have ends 171A and 175A coupled together and to ground and ends 171B and 175B coupled to the loop compensator 54. If the core 163 moves in one direction on one side of the center tap, a higher voltage is applied to the compensator 54 and if the core 163 moves in an opposite direction on the same side of the center tap, a lower voltage is applied to the compensator 54. The compensator 54 may either of analog or digital design and includes a demodulator for LVDT signal processing.

Figure 4:
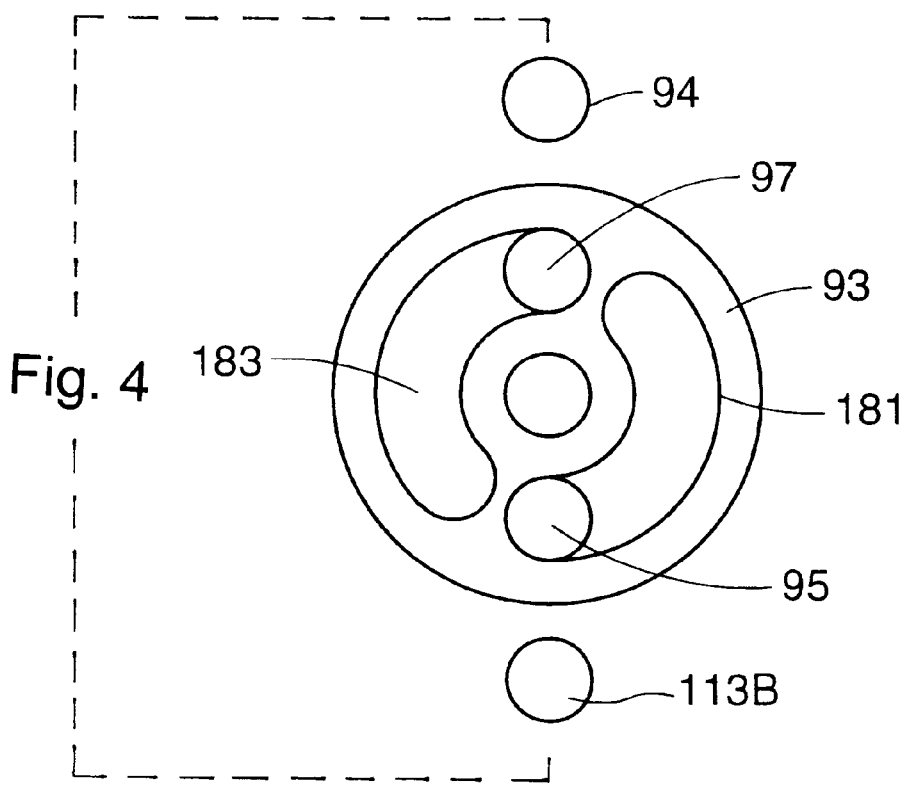
FIG. 4 is a partial cross-section of FIG. 3 as seen along lines 4—4 thereof illustrating the channels of the variable displacement fluid pump.

The variable displacement pump 69 may be of the type produced by VICKERS, INC. Referring to FIG. 4, the pump 69 comprises two arcuate channels 181 and 183 formed in plate 93 and coupled to ports 95 and 97 respectively. As the rotor 87 rotates counter clockwise as seen in FIG. 3, and the piston 91 next to port 97 moves away from the plate 93, fluid pressure is decreased at port 97 and fluid is pulled into channel 183. At the same time, as the opposite piston 91 moves toward the plate 93, fluid is caused to flow from channel 181 to port 95. Rotation of the rotor 87 in the opposite direction reverses the flow of fluid. The direction of rotation of the rotor 87 is determined by the algebraic sign of the error signal.

What is claimed is:

1. A system for controlling a structural member of an aircraft, comprising:

a hydraulic actuator comprising a cylinder having a piston to be coupled to a structural member of an aircraft for moving the structural member and having two fluid actuator ports for receiving and discharging fluid into and from said cylinder for moving said piston to retracted and extended positions, a loop gain compensator, a summing means having an output coupled to said loop gain compensator, means for applying a command signal to said summing means, means for sensing the position of said piston and for producing an electrical output representative of said position, means for applying said electrical output to said summing means, a servo motor coupled to the output of said loop gain compensator, a variable displacement fluid pump having two fluid pump ports coupled to said two fluid actuator ports respectively, a rotatable member having bores with pistons, and a swash plate for controlling the flow of fluid through said two fluid pump ports of said variable displacement fluid pump, said servo motor having a shaft coupled to said rotatable member for rotating said rotatable member, a de-stroking actuator having a de-stroking piston, movable in first and second opposite directions, coupled to said swash plate of said variable displacement fluid pump for controlling the angle of said swash plate, means for urging said de-stroking piston in said first direction to increase the swash plate angle, a sensor having two conduits coupled to said two fluid actuator ports of said cylinder for directing fluid from the fluid actuator port of said cylinder having the highest pressure, to said de-stroking actuator to move said de-stroking piston in said second direction to decrease the swash plate angle of said variable displacement fluid pump.

2. The system of claim 1, comprising:

means for sensing the angular position of said swash plate and for obtaining an electrical signal representative of the angular position of said swash plate, and means for applying the reciprocal of said electrical signal to said loop gain compensator.

3. A system for controlling a structural member of an aircraft, comprising:

a hydraulic actuator comprising a cylinder having a piston to be coupled to a structural member of an aircraft for moving the structural member and having two fluid actuator ports for receiving and discharging fluid into and from said cylinder for moving said piston to retracted and extended positions, a variable displacement fluid pump having two fluid pump ports coupled to said two fluid actuator ports respectively and having a rotatable member having bores with pistons, and a swash plate for controlling the flow of fluid through said two fluid pump ports, a servo motor responsive to a summed signal comprising a command signal and a feedback signal responsive to the position of said piston of said hydraulic actuator for rotating said rotatable member of said variable displacement fluid pump, a de-stroking actuator having a de-stroking piston, movable in first and second opposite directions, coupled to said swash plate of said variable displacement fluid pump for controlling the angle of said swash plate, means for urging said de-stroking piston in said first direction to increase the swash plate angle, a sensor having two conduits coupled to said two fluid actuator ports of said cylinder for directing fluid from the fluid actuator port of said cylinder having the highest pressure, to said de-stroking actuator to move said de-stroking piston in said second direction to decrease the swash plate angle of said variable displacement fluid pump.

4. The system of claim 1, wherein:

said piston of said cylinder of said hydraulic actuator is coupled to said structural member of said aircraft.

5. The system of claim 1, wherein:

said sensor comprises a sensor cylinder having first and second opposite ends, a free floating piston located in said sensor cylinder, said de-stroking piston is located in a de-stroking cylinder, said de-stroking piston comprises first and second opposite ends with said first end coupled to said swash plate, said means for urging said de-stroking piston in a first direction comprises a spring for applying pressure to said second end of said de-stroking piston, first and second conducts coupled from one of said two conducts to said first end of said sensor cylinder and from first end of said sensor cylinder to said de-stroking cylinder to apply fluid pressure to said first end of said de-stroking piston to move said de-stroking piston in said second direction, third and fourth conducts coupled from the other of said two conducts to said second end of said sensor cylinder and from said second end of said sensor cylinder to said first end of said de-stroking cylinder to apply fluid pressure to said first end of said de-stroking piston to move said de-stroking piston in said second direction.

6. The system of claim 5, wherein:

said piston of said cylinder of said hydraulic actuator is coupled to said structural member of said aircraft.

7. The system of claim 5, comprising:

means for sensing the angular position of said swash plate and for obtaining an electrical signal representative of the angular position of said swash plate, and means for applying the reciprocal of said electrical signal to said loop gain compensator.

8. The system of claim 6, wherein:

means for sensing the angular position of said swash plate and for obtaining an electrical signal representative of the angular position of said swash plate, and means for applying the reciprocal of said electrical signal to said loop gain compensator.

9. The system of claim 3, wherein:

said sensor comprises a sensor cylinder having first and second opposite ends, a free floating piston located in said sensor cylinder, said de-stroking piston is located in a de-stroking cylinder, said de-stroking piston comprises first and second opposite ends with said first end coupled to said swash plate, said means for urging said de-stroking piston in a first direction comprises a spring for applying pressure to said second end of said de-stroking piston, first and second conducts coupled from one of said two conducts to said first end of said sensor cylinder and from first end of said sensor cylinder to said de-stroking cylinder to apply fluid pressure to said first end of said de-stroking piston to move said de-stroking piston in said second direction, third and fourth conducts coupled from the other of said two conducts to said second end of said sensor cylinder and from said second end of said sensor cylinder to said first end of said de-stroking cylinder to apply fluid pressure to said first end of said de-stroking piston to move said de-stroking piston in said second direction.

* * * * *